(12) United States Patent
Sams et al.

(10) Patent No.: US 11,170,283 B2
(45) Date of Patent: Nov. 9, 2021

(54) POST-CURE READ RANGE ENHANCEMENT OF RFID TIRE TAGS

(71) Applicant: Bridgestone Americas Tire Operations, LLC, Nashville, TN (US)

(72) Inventors: Thomas A. Sams, Hartville, OH (US); Craig R. Balnis, Aberdeen, NC (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 16/764,960

(22) PCT Filed: Jan. 10, 2019

(86) PCT No.: PCT/US2019/012951
§ 371 (c)(1),
(2) Date: May 18, 2020

(87) PCT Pub. No.: WO2019/140020
PCT Pub. Date: Jul. 18, 2019

(65) Prior Publication Data
US 2020/0349410 A1    Nov. 5, 2020

Related U.S. Application Data

(60) Provisional application No. 62/615,996, filed on Jan. 11, 2018.

(51) Int. Cl.
G06K 19/077 (2006.01)
B60C 23/04 (2006.01)
B29D 30/00 (2006.01)

(52) U.S. Cl.
CPC .... G06K 19/07764 (2013.01); B60C 23/0493 (2013.01); B29D 2030/0077 (2013.01)

(58) Field of Classification Search
CPC .......... G06K 19/07764; B60C 23/0493; B29D 2030/0077
See application file for complete search history.

(56) References Cited

U.S. PATENT DOCUMENTS 4,137,520 A    1/1979  Deveau
5,479,171 A *  12/1995  Schuermann ....... B60C 23/0493
                                                340/10.41

(Continued)

FOREIGN PATENT DOCUMENTS

CA    2421993 A1    12/1995
CA    2421993        1/2005

(Continued)

OTHER PUBLICATIONS

International search report and written opinion from PCT/US2019/012951, dated May 28, 2019.

(Continued)

*Primary Examiner* — Hongmin Fan

(57) ABSTRACT

Methods for increasing the read range of an electronic communication module within a tire and methods for improving the read range of an electronic communication module within a tire are provided herein. As discussed further herein, the read range can be increased by applying strain to the tire without abrading its tread, resulting in an increase in read range of 20% or more. Similarly, the read range can be improved by applying strain to the tire without circumferentially contacting the outer surface of its tread, resulting in an increase in the same-distance-signal-strength of 5% or more. Also provided are tires made according to the disclosed methods.

20 Claims, 2 Drawing Sheets

(56) References Cited

U.S. PATENT DOCUMENTS

Figure 1:
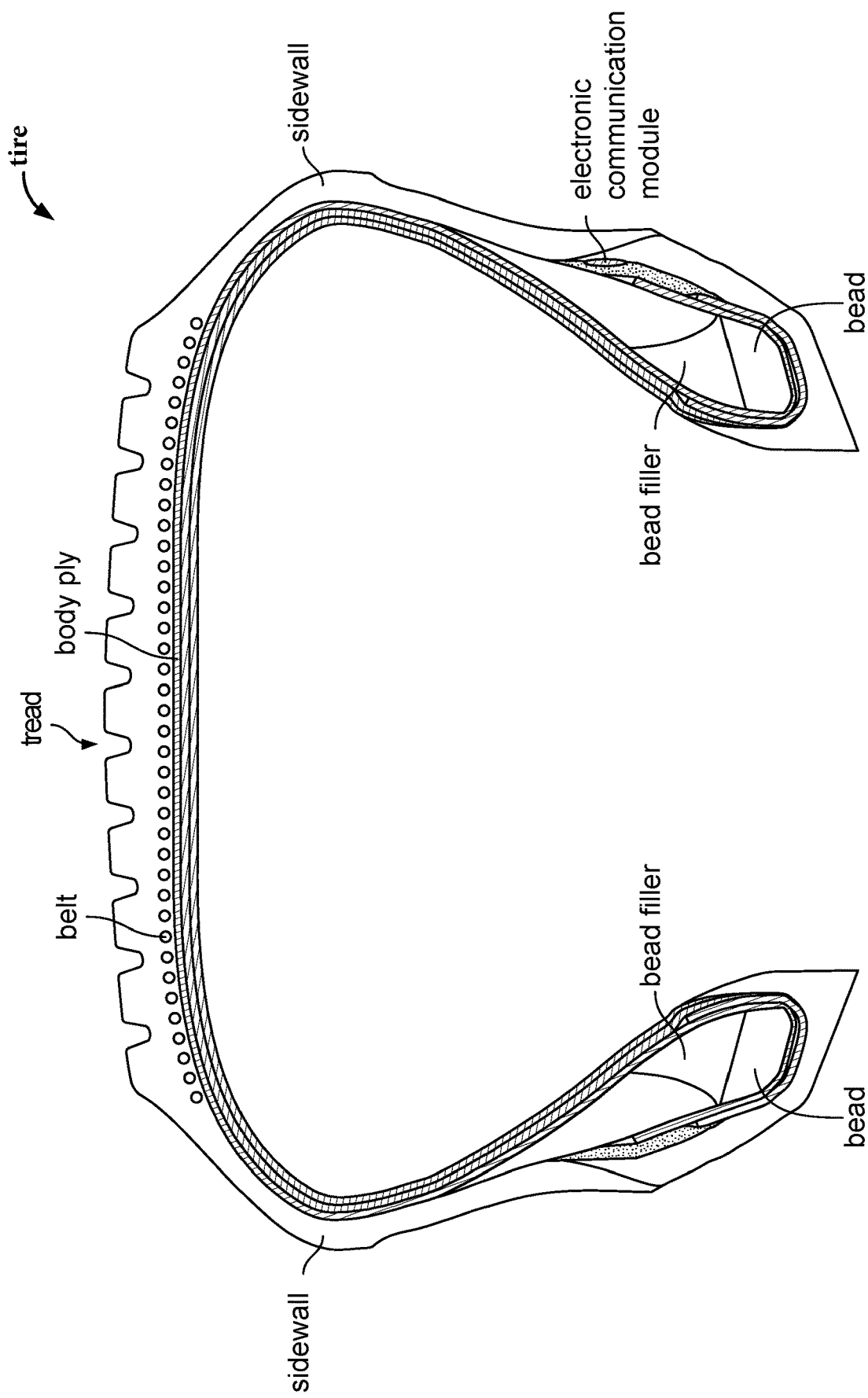
Figure 2:
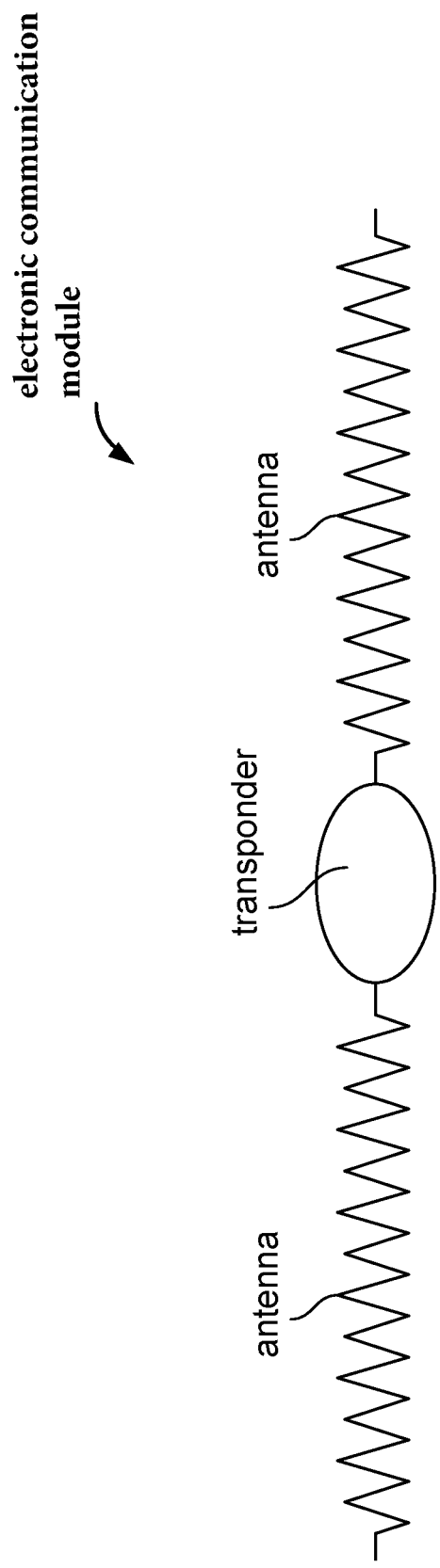

| | | | |
|---|---|---|---|
| 6,147,659 A * | 11/2000 | Takahashi | B60C 9/2006 |
| | | | 343/866 |
| 7,193,516 B2 | 3/2007 | Choi et al. | |
| 7,292,138 B2 | 11/2007 | Jang | |
| 7,492,328 B2 | 2/2009 | Kish et al. | |
| 8,138,294 B2 | 3/2012 | Henning et al. | |
| 8,977,422 B1 | 3/2015 | Westfall | |
| 9,205,709 B2 | 12/2015 | Bruneau et al. | |
| 2003/0102961 A1 * | 6/2003 | Fischer | G06K 19/0723 |
| | | | 340/10.1 |
| 2003/0221766 A1 * | 12/2003 | Strache | B60C 23/0433 |
| | | | 156/123 |
| 2006/0238356 A1 | 10/2006 | Tucker | |
| 2011/0012723 A1 | 1/2011 | Adamson et al. | |
| 2014/0009267 A1 | 1/2014 | Bracq et al. | |
| 2016/0092814 A1 | 3/2016 | Yun et al. | |
| 2017/0136832 A1 | 5/2017 | So et al. | |
| 2017/0305088 A1 | 10/2017 | Tucker | |
| 2017/0308782 A1 * | 10/2017 | Burkholder | H01L 21/84 |
| 2017/0368874 A1 | 12/2017 | Balnis et al. | |

FOREIGN PATENT DOCUMENTS

| | | |
|---|---|---|
| CN | 101137517 A | 3/2008 |
| CN | 103338948 A | 10/2013 |
| EP | 2524818 | 7/2014 |
| EP | 2524818 B1 | 7/2014 |
| JP | 2003-159918 A | 6/2003 |
| JP | 2006-059363 A | 3/2006 |
| KR | 10-1059589 B1 | 11/2010 |
| KR | 101059589 | 8/2011 |
| KR | 20170056329 | 5/2017 |
| KR | 10-2017-0056329 A | 10/2017 |
| WO | 2016-105938 A1 | 6/2016 |
| WO | 2016105929 A1 | 6/2016 |
| WO | 2016105938 | 6/2016 |
| WO | 2016-137771 A1 | 9/2016 |
| WO | 2018020143 A1 | 2/2018 |

OTHER PUBLICATIONS

Tire Recalls and Tire Safety: The RFID Solution, Safety Research & Strategies Inc., Nov. 1, 2007.
Hu, Shengbo, et al., "Power Transmission of UHF Passive Embedded RFID in Tires," International Journal of Antennas and Propagation, vol. 2014, Article ID 897041, 8 pages.
New tyre tread label offers global RFID functionality, Feb. 10, 2017, 2 pages.
Off The Road Tire Databook, Firestone, copyright 2015.
International Preliminary Report on Patentability from PCT/US2019/012951, dated Jul. 14, 2020.
International Preliminary Report on Patentability; Corresponding WO Application No. PCT/US2019/012951; dated Jul. 14, 2020.
New Tyre Tread Label Offers Global RFID Functionality, Tyre Press, Web Page <https://www.tyrepress.com/2017/02/new-tyre-tread-label-offers-global-rfid-functionality/>, Feb. 10, 2017.
Power Transmission of UHF Passive Embedded RFID in Tires, Hindawi Publishing Corporation, International Journal of Antennas and Propagation, vol. 2014, Article ID 897041, Feb. 17, 2014.
Tire Recalls and Tire Safety: The RFID Solution, Safety Research & Strategies, Inc., Web Page <https://www.safetyresearch.net/sites/default/files/recalls_rfid.pdf>, Nov. 1, 2007.
Third party observations filed in Japanese counterpart application 2020-534985 in on Apr. 1, 2021.
Notice from Japanese Patent Office dated Jun. 8, 2021, informing of filing of third party observations in Japanese counterpart application 2020-534985.
Communication from the European Patent Office dated Jul. 21, 2021 in EP application No. 19738210.4 transmitting supplementary European search report and European search opinion.

* cited by examiner

POST-CURE READ RANGE ENHANCEMENT OF RFID TIRE TAGS

This application is a national stage application of PCT/US2019/012951 filed on Jan. 10, 2019, which claims priority to U.S. Provisional Application Ser. No. 62/615996 filed on Jan. 11, 2018, which are incorporated herein by reference in their entirety.

FIELD

The present application is directed to methods for increasing or improving the read range of RFID tire tags and to tires made from the foregoing methods.

BACKGROUND

Electronic communication modules (which in some instances are RFID tire tags) integrated in a tire can provide various functions such as identification and tracking during manufacture, distribution, and use of a tire. Such devices can also (or alternatively) function to monitor physical parameters such as pressure and temperature during use of the tire. The devices may be passive or active depending on design and desired functions.

One type of known electronic communication module stores a unique identification number that may be read by a remote device that obtains the information from the tire identification device. Tire manufacturers may wish to incorporate such a device into each tire manufactured so that the tire may be tracked during the manufacturing process and during subsequent use on vehicles. Electronic communication modules may also be configured to read operating conditions of the tire and transmit the information from the tire to an outside reader. Such devices may be useful to trigger alarms when certain operating conditions are met (e.g., the pressure of the tire is too low). These monitoring devices may also be configured to store the information for later retrieval.

The electronic communication modules can be incorporated into various rubber-based components of a tire (e.g., sidewall, tread, nylon-containing skim ply, and bead filler). Each such component will have a dielectric constant which influences the maximum read range or distance from which the radio device of the electronic communication module can be detected or "read."

SUMMARY

Disclosed herein are methods for increasing or improving the read range of an electronic communication module within a tire. Also disclosed are tires resulting from such methods.

In a first embodiment, a method is disclosed for increasing the read range of an electronic communication module within a tire. The method comprises providing a tire comprising a tread, one or more belts, a carcass with body ply or plies, two beads, and an electronic communication module comprising a radio device and applying strain to the tire without abrading the tread, wherein applying strain results in an increase in the read range of at least 20%.

In a second embodiment, a method is disclosed for improving the read range of an electronic communication module within a tire. The method comprises providing a tire comprising a tread having an outer surface, one or more belts, a carcass with body ply or plies, two beads, and an electronic communication module comprising a radio device and applying strain to the tire without circumferentially contacting the outer surface of the tread, wherein applying strain results in an increase in same-distance signal strength of the electronic communication module of at least 5%.

In a third embodiment, a tire resulting from the method of the first embodiment is disclosed. Discussions herein of the methods of the first embodiment (e.g., of the properties of the resulting tire, properties of the electronic communication module located therein, etc.) should be understood to apply as fully as possible to the tire of the third embodiment.

In a fourth embodiment, a tire resulting from the method of the second embodiment is disclosed. Discussions herein of the methods of the second embodiment (e.g., of the properties of the resulting tire, properties of the electronic communication module located therein, etc.) should be understood to apply as fully as possible to the tire of the fourth embodiment.

DETAILED DESCRIPTION

Disclosed herein are methods for increasing or improving the read range of an electronic communication module within a tire. Also disclosed are tires resulting from such methods.

In a first embodiment, a method is disclosed for increasing the read range of an electronic communication module within a tire. The method comprises providing a tire comprising a tread, one or more belts, a carcass with body ply or plies, two beads, and an electronic communication module comprising a radio device and applying strain to the tire without abrading the tread, wherein applying strain results in an increase in the read range of at least 20%.

In a second embodiment, a method is disclosed for improving the read range of an electronic communication module within a tire. The method comprises providing a tire comprising a tread having an outer surface, one or more belts, a carcass with body ply or plies, two beads, and an electronic communication module comprising a radio device and applying strain to the tire without circumferentially contacting the outer surface of the tread, wherein applying strain results in an increase in same-distance signal strength of the electronic communication module of at least 5%.

In a third embodiment, a tire resulting from the method of the first embodiment is disclosed. Discussions herein of the methods of the first embodiment (e.g., of the properties of the resulting tire, properties of the electronic communication module located therein, etc.) should be understood to apply as fully as possible to the tire of the third embodiment.

In a fourth embodiment, a tire resulting from the method of the second embodiment is disclosed. Discussions herein of the methods of the second embodiment (e.g., of the properties of the resulting tire, properties of the electronic communication module located therein, etc.) should be understood to apply as fully as possible to the tire of the fourth embodiment.

Definitions

The terminology as set forth herein is for description of the embodiments only and should not be construed as limiting the invention as a whole.

As used herein, the terms "axial" and "axially," refer to a direction that is parallel to the axis of rotation of a tire.

As used herein, the "body ply or plies" refers to one or more plies of rubber-covered cords which are contained within the carcass of a tire.

As used herein, the terms "circumferential" and "circumferentially," refer to a direction extending along the perimeter of the surface of the annular tread perpendicular to the axial direction.

As used herein, the phrase "dielectric constant" encompasses both real and imaginary components. The real component or permittivity is a measure of how much energy from an external field is stored in a material and can be calculated from the ratio of the dielectric permittivity of a material to the permittivity of a vacuum. The imaginary component or loss factor is a measure of how dissipative or lossy a material is to an external electric field.

As used herein, the terms "radial" and "radially," refer to a direction perpendicular to the axis of rotation of a tire.

As used herein, the phrase "read range" refers to the maximum distance (in meters) from which the radio device of the electronic communication module can be detected or "read" such as by a reader.

Methods for Increasing Read Range

As discussed above, the first embodiment disclosed herein is a method for increasing the read range of an electronic communication module within a tire. The method comprises providing a tire comprising a tread, one or more belts, a carcass with body ply or plies, two beads, and an electronic communication module comprising a radio device and applying strain to the tire without abrading the tread, wherein applying strain results in an increase in the read range of at least 20%. As also discussed above, the third embodiment disclosed herein is a tire made by a method according to the first embodiment. Any discussion herein of the methods of the first embodiment (e.g., of the properties of the resulting tire, properties of the electronic communication module located therein, etc.) should be understood to apply as fully as possible to the tire of the third embodiment.

As discussed above, according to the first embodiment disclosed herein, the method results in an increase in the read range of at least 20% (e.g., 20%, 25%, 30%, 35%, 40%, 45%, 50%, 55%, 60%, 65%, 70%, 75%, 80%, 85%, 90%, 95%, 100%, or more). In other words, according to the method of the first embodiment, the read range distance increases by at least 20%. In certain embodiments of the first embodiment, the increase in the read range may be as much as 150% (e.g., 150%, 140%, 130%, 120%, 110%, 100%, 90%, 80%, etc.) or as much as 200% (e.g., 200%, 190%, 180%, 170% 160%, 150%, 140%, 130%, 120%, 110%, 100%, 90%, 80%, etc.), and, as such the increase may be described in ranges such as 20-150%, 20-200%, 30-150%, 30-200%, etc. The increase in read range is as compared to the read range of an electronic communication module within a tire which has the same components and has been prepared according to the same manufacturing methods (i.e., a control tire), but has not been subjected to the step of applying strain to the tire without abrading the tread. As a non-limiting example, if a control tire had a read range of 1 meter and a test tire (having the same components and prepared according to the same manufacturing methods) was produced (by applying strain to each test tire without abrading the tread) which had a read range of 1.2 meters, the test tire would have an increase in read range of 20%. Comparative measurements of read range should be made at the same temperature (e.g., about 70 degrees Fahrenheit) and humidity. By stating that the control and test tires have the same components it is intended not only that the same type of components (e.g., tread, belts, etc.) are present in each tire, but also that their respective compositions (materials of construction) are the same and that they were made according to the same manufacturing methods. However, it should be understood that in certain embodiments of the first embodiment, the increase in read range in a tire made according to the process of the first embodiment will also be met for the same tire when comparison is made between the tire before applying strain and after applying strain. In certain embodiments of the first embodiment, the method results in an increase in the read range of at least 50% (e.g., 50%, 55%, 60%, 65%, 70%, 75%, 80%, 85%, 90%, 95%, 100%, or more). In certain embodiments of the first embodiment, the method results in an increase in the read range of up to about 100% or more. The amount of strain which is applied to the tire may influence the % increase in the read range. Similarly, tires of differing construction and tires which have been prepared according to different manufacturing methods may experience differing % increases in their read range upon application of the same amount of strain. Generally, the read range can be determined by reading the electronic communication module using a reader at a relatively short or close distance and then moving the reader away at set increments (e.g., 1 inch at a time, 3 centimeters at a time, etc.) until a distance is reached at which the reader is unable to read the electronic communication module. The distance just before the distance at which the reader is unable to read the electronic communication module can be considered to be the read range.

Applying Strain

As discussed above, the methods of the first and second embodiments include applying strain to the tire. Generally, strain can be understood as a deformation that is caused by an external force. The particular method or methods used to apply strain to the tire without abrading the tread of the tire may vary. Moreover, the particular location or locations of the tire to which the strain is applied may vary, as discussed in more detail below.

In certain embodiments of the first and second embodiments, applying strain comprises mounting and unmounting the tire. The mounting of the tire is followed by unmounting of the tire or in other words, the tire is mounted and then unmounted with the strain being applied between mounting and unmounting. In certain embodiments of the first and second embodiments, applying strain consists of mounting and unmounting the tire (i.e., strain is not applied by any other method). In other embodiments of the first and second embodiments, applying strain by mounting and unmounting the tire may be combined with other methods of applying strain, as discussed below. When strain is applied by mounting and unmounting the tire, it should be understood that the tread of the tire is not abraded before the tire is unmounted. Thus, embodiments of the methods of first and second embodiments wherein applying strain to the tire without abrading the tire comprises mounting and unmounting the tire do not include mounting the tire upon a vehicle, followed by operation of vehicle (wherein the tire tread contacts a road surface) before unmounting the tire. Similarly, embodiments of the methods of the first and second embodiments wherein applying strain to the tire without abrading the tire comprises mounting and unmounting the tire are not intended to include mounting the tire upon a test drum wherein the tire is subjected to rotation and contact of the radially outer tread surface prior to unmounting (since such a process would cause at least some abrasion of the tread).

In certain embodiments of the first and second embodiments, applying strain comprises applying an external force to the tire at a location surrounding the electronic communication module, thereby resulting in deformation. In certain such embodiments, the method of the first and/or second embodiment includes (further comprises) mounting the tire before applying strain and then unmounting the strained tire. As discussed further herein, according to the first and second embodiments, the location of the electronic communication module within the tire may vary. Accordingly, the particular location surrounding the electronic communication module will vary based upon the location of the electronic communication module. In certain embodiments of the first and second embodiments, wherein applying strain comprises applying external force to the tire at a location surrounding the electronic communication module, the "location surrounding" can be considered to constitute a location within about 15 cm of the center of the radio device of the electronic communication module. In certain embodiments of the first and second embodiments, wherein applying strain comprises applying external force to the tire at a location surrounding the electronic communication module, the "location surrounding" can be considered to constitute a location or locations anywhere within a circle drawn around the center of the radio device of the electronic communication module, the circle having a radius of about 5 to about 15 cm. In certain such embodiments, the circle has a radius of 5-15 cm (e.g., 5, 6, 7, 8, 9, 10, 11, 12, 13, 14, or 15 cm), about 7 to about 12 cm, 7 to 12 cm (e.g., 7, 8, 9, 10, 11, or 12 cm), about 7 to about 10 cm, 7 to 10 cm (e.g., 7, 8, 9, or 10 cm), about 5 to about 10 cm, or 5 to 10 cm (e.g., 5, 6, 7, 8, 9, or 10 cm). In certain embodiments of the first and second embodiments, wherein applying strain comprises applying external force to the tire at a location surrounding the electronic communication module, it can be desirable to avoid applying force directly to the radio device portion of the electronic communication module. In certain embodiments of the first and second embodiments, wherein applying strain comprises applying external force to the tire at a location surrounding (e.g., the "location surrounding" constituting one of the above-discussed locations) the electronic communication module, at least one bead of the tire (i.e., one bead or both (two) beads) is fixed prior to the application of strain. In such methods, various methods for fixing at least one bead of the tire may be utilized, including, but not limited to, clamping of the at least one bead and/or placing the at least one bead against a fixed, rigid surface such as a rim.

According to those embodiments of the first and second embodiments wherein applying strain comprises applying external force to the tire at a location surrounding the electronic communication module, the amount of force that is applied may vary. In certain embodiments of the first and second embodiments, the applying of strain by application of external force to the tire includes application of a force which pulls and/or pushes the tire at a location surrounding the electronic communication module. In certain embodiments of the first and second embodiments, the applying of strain by application of external pressure to the tire includes application of a force which flexes the tire at a location surrounding the electronic communication module. In certain embodiments of the first and second embodiments, the applying of strain by application of external force to the tire includes application of a force which stretches the tire at a location surrounding the electronic communication module. In certain embodiments of the first and second embodiments, the amount of force that is applied is sufficient to cause at least a 10% strain (e.g., 10%, 11%, 12%, 13%, 14%, 15%, 16%, 17%, 18%, 19%, 20%, 22%, 24%, 26%, 28%, 30% or more) and in other embodiments the amount of force that is applied is sufficient to cause at least a 20% strain (e.g., (e.g., 20%, 21%, 22%, 23%, 24%, 25%, 26%, 27%, 28%, 29%, 30%, 32%, 34%, 36%, 38%, 40% or more) in the area of interest (e.g., a location surrounding the electronic communication module). As a non-limiting example, a force which caused a deformation of 1 cm in a wire having a length of 10 cm can be understood as creating a strain of 10%. According to the first and second embodiments, particular methods in applying force to the tire at a location surrounding the electronic communication may vary. In certain embodiments of the first and second embodiments, force is applied by contacting the area surrounding the electronic communication module with a plate attached to a machine capable of exerting force upon the tire by contacting the plate with the tire. In certain such embodiments, the plate is retractably attached to the machine capable of exerting force. According to the first and second embodiments, the surface area of the plate which contacts the area surrounding the electronic communication module to apply force may vary. For example, the surface area may be about 5 cm$^2$ to about 60 cm$^2$ or 5-60 cm$^2$ (e.g., 5, 10, 15, 20, 25, 30, 35, 40, 45, 50, 55, or 60 cm$^2$). In certain embodiments of the first and second embodiments, the plate is flat with a smooth surface. In other embodiments of the first and second embodiments, the plate contains raised edges which contact the tire, allowing for the application of pressure/force surrounding the electronic communication module while avoiding the area of the tire directly outside the electronic communication module to avoid damage thereto.

In certain embodiments of the first and second embodiments, applying strain comprises laterally deflecting the tire. In such embodiments, the component of the tire which is laterally deflected may vary. In certain such embodiments, laterally deflecting comprises applying a pushing and/or pulling force to the tire sidewall either at the location of the electronic communication module or at a location surrounding the electronic communication module. In other such embodiments, laterally deflecting comprises applying a pushing and/or pulling force to at least one bead of the tire. In certain embodiments of the first and second embodiments, wherein applying strain comprises laterally deflecting the tire, the method includes (further comprises) fixing the two beads of the tire and clamping the tread at its outside prior to laterally deflecting. More specifically, the two beads can be fixed and the tire tread loaded against a surface, followed by lateral deflection of the beads. In certain embodiments of the first and second embodiments wherein applying strain comprises laterally deflecting the tire, the method of the first and/or second embodiment includes (further comprises) mounting the tire before applying strain and then unmounting the strained tire.

As mentioned above, in certain embodiments of the first and second embodiments, the tire is mounted before applying strain and then the strained tire is unmounted. In certain embodiments of the first and second embodiments wherein applying strain comprises mounting and unmounting the tire (e.g., as in the foregoing sentence), the tire is mounted upon an expandable rim before applying strain. In other words, in such embodiments, the tire is mounted upon an expandable rim, strain is applied while the tire is mounted producing a strained tire, and the strained tire is unmounted. In such embodiments, the location to which the strain is applied may vary, as discussed above. Use of an expandable rim for mounting of the tire prior to applying strain allows for the strain to be applied as part of the overall manufacturing process and generally prior to the shipment of the tire from its manufacturing location. Various types of expandable rims are available, including, but not limited to those disclosed in International Application Publication No. WO2016/137771A1, the disclosure of which is herein incorporated by reference.

Without Abrading

As discussed above, the method of the first embodiment includes applying strain to the tire without abrading the tread. Abrasion of the tread can be understood as a wearing away of the tread. Generally, abrasion of a tire tread occurs from contact of the radially outward facing (or road-contacting) surface of the tread with another surface. During use of a tire, the tire tread is abraded by contact with a road surface (i.e., when the tire is mounted upon a vehicle and the vehicle is driven upon a road surface). Similarly, a tire tread can undergo abrasion by virtue of being mounted upon a test drum wherein the tire is subjected to rotation and contact of the radially outer tread surface prior to unmounting (since such a process would cause at least some abrasion of the tread). Thus, applying strain to the tire without abrading the tread should be understood to exclude any application of strain which occurs by mounting the tire upon a vehicle and driving the vehicle upon a road surface and also to exclude any application of strain which occurs by mounting the tire upon a test drum wherein the tire is subjected to rotation and contact of the radially outer tread surface with another surface prior to unmounting, since either of these would cause at least some abrasion of the tread.

As used herein, the phrase without abrading the tread or without abrasion of the tread is intended to refer to an amount of abrasion which is detectable by visual inspection, by measuring the thickness of the tire tread, and/or by measuring the weight of the overall tire. Abrasion which is detectable by visual inspection refers to abrasion which can be viewed by the human eye without the use of magnification. Abrasion which is detectable by measuring the thickness of tread (or alternatively the depth of a groove in the tread) refers to abrasion which can be measured such as by a tire depth gauge, and includes a decrease in the thickness of tread (or a decrease in the depth of a groove in the tread) of at least 0.05 mm (e.g., 0.05 mm, 0.06 mm, 0.07 mm, 0.08 mm, 0.09 mm, 0.1 mm, 0.11 mm, 0.12 mm, 0.13 mm, 0.14 mm, 0.15 mm, 0.16 mm, 0.17 mm, 0.18 mm, 0.19 mm, 0.2 mm, 0.22 mm, 0.24 mm, 0.26 mm, 0.28 mm, 0.3 mm, 0.35mm, 0.4 mm, 0.45 mm, 0.5 mm, or more). Abrasion which is detectable by measuring the weight of the overall tire refers to abrasion of the tire tread which can be measured by a decrease in the overall tire weight and includes a decrease in the weight of the overall tire of at least 1% (e.g., 1%, 2%, 3%, 4%, 5%, 6%, 7%, 8%, 9%, 10%, 12%, 14%, 15%, 16%, 18%, 20% or more). Most preferably, the determination of whether a given process results in abrasion of the tread is determined by visually inspecting or measuring a tire prior to subjecting it to given process conditions and then visually inspecting or measuring the same tire after the given process.

Improving Read Range

As discussed above, the method of the second embodiment disclosed herein is directed to improving the read range of an electronic communication module within a tire. The method of the second embodiment can alternatively be described as a method for increasing the same-distance signal strength of the electronic communication module within a tire.

According to the second embodiment, applying strain to the tire without circumferentially contacting the outer surface of the tread results in an increase in the same-distance signal strength of at least 5% (e.g., 5%, 6%, 7%, 8%, 9%, 10%, 12%, 14%, 16%, 18%, 20%, 22%, 24%, 26%, 28%, 30%, or more). In certain embodiments of the second embodiment, the increase in the same-distance signal strength may be as much as 100% (e.g., 100%, 95%, 90%, 85%, 80%, 75%, 70%, 65%, 60%, 55%, 50%, 45%, 40%, 35%, 30%, etc), and, as such the increase may be described in ranges such as 5-100%, 5-90%, 7-100%, 7-90%, 10-100%, 10-90%, 10-80%, etc. The increase in the same-distance signal strength refers to an increase in the strength of the signal emitted (e.g., transponded for a passive device or transmitted for an active device) from the electronic communication when measured at a given distance after applying strain and compared to the strength of the signal measured at the same distance before applying strain and can be determined by comparing the same-distance signal strength of an electronic communication module within a strained tire to a control tire which has the same components and has been prepared according to the same manufacturing methods (i.e., a control tire), but has not been subjected to the step of applying strain to the tire without abrading the tread. By stating that the control and test tires have the same components it is intended not only that the same type of components (e.g., tread, belts, etc.) are present in each tire, but also that their respective compositions (materials of construction) are the same and that they were made according to the same manufacturing methods. However, it should be understood that in certain embodiments of the second embodiment, the increase in same-distance signal strength in a tire made according to the process of the second embodiment will also be met for the same tire when comparison is made between the tire before applying strain and after applying strain. Comparative measurements of same-distance signal strength should be made at the same temperature (e.g., about 70 degrees Fahrenheit) and humidity. Preferably, the increase in the same-distance signal strength is measured at a distance of 0.5 meters from the electronic communication module with each measurement made using the same reader. Of course, it should be understood than according to the second embodiment, similar increases in the same-distance signal strength may also be experienced at other distances from the electronic communication module. In certain embodiments of the second embodiment, the increase in the same-distance signal strength also results in an increase in the read range of at least 10% or even at least 20% (as discussed further, infra). As also discussed above, the fourth embodiment disclosed herein is a tire made by a method according to the second embodiment. Any discussion herein of the methods of the second embodiment (e.g., of the properties of the resulting tire, properties of the electronic communication module located therein, etc.) should be understood to apply as fully as possible to the tire of the fourth embodiment.

By stating that strain is applied to the tire without circumferentially contacting the outer surface of the tread, is meant that during the application of strain, no portion of a complete circumference of the outer tread surface of the tire is contacted. By avoiding circumferential contact with the outer surface of the tread of the tire, abrasion of the tread is avoided. Thus, embodiments of the method of the second embodiment wherein applying strain to the tire without circumferentially contacting the outer surface of the tread comprises mounting and unmounting the tire do not include mounting the tire upon a vehicle, followed by operation of vehicle (wherein the tire tread contacts a road surface, resulting in abrasion) before unmounting the tire. Similarly, embodiments of the method of the second embodiment wherein applying strain to the tire without circumferentially contacting the outer surface of the tread comprises mounting and unmounting the tire are not intended to include mounting the tire upon a test drum wherein the tire is subjected to rotation and contact of the radially outer tread surface prior to unmounting (since such a process would involve circumferential contact of the outer surface of the tread of the tire, resulting in abrasion). Of course, the phrase "without circumferentially contacting the outer surface of the tread" is not meant to refer to artificial or contrived methods of contacting a portion of (or all of) a complete circumference of the tread such as could be followed merely in an attempt to avoid practice of the methods of the second embodiment.

Electronic Communication Module

As discussed above, the methods of the first and second embodiments generally relate to a tire having an electronic communication module. Generally, the electronic communication module will include (comprise) a radio device. In certain embodiments of the first and second embodiments, the electronic communication module has at least a portion of its outer surface surrounded by a rubber composition.

According to the first and second embodiments, the electronic communication module may be located in varying areas of the tire. In certain embodiments of the first and second embodiments, the electronic communication module is located in the sidewall of the tire. Generally, the sidewall of a tire can be understood as having an inside and outside wall. In certain such embodiments, the electronic communication module is in contact with the bead filler component of the tire, on the outside wall of the sidewall, or between the bead filler and sidewall. In certain embodiments of the first and second embodiments, the electronic communication module is located in the sidewall of the tire and in contact with the bead filler component of the tire. In certain embodiments of the first and second embodiments, the electronic communication module is located in the sidewall of the tire and more specifically on the outside wall of the sidewall. In certain embodiments of the first and second embodiments, the electronic communication module is located in the sidewall of the tire between the bead filler and sidewall. In certain embodiments of the first and second embodiments wherein the electronic communication module is located in the sidewall of the tire, a rubber patch is used to attach the module to the sidewall. In certain embodiments of the first and second embodiments, the electronic communication module is located in the carcass of the tire. Generally, the carcass of the tire can be understood as including a body ply or plies (each of) which constitute rubber-covered cords with the rubber covering also being referred to as a body skim. Thus, a body ply comprises cords with a body skim of rubber covering the cords. In certain embodiments of the first and second embodiments, the electronic communication module is located in the body skim of the tire. In certain embodiments of the first and second embodiments, at least one of the following is met: (a) the electronic communication module is located in the sidewall of the tire; (b) the electronic communication module is located in the carcass of the tire; or (c) the electronic communication module is located in the body skim of the tire; in certain such embodiments each of (a)-(c) is met.

In those embodiments of the first and second embodiments disclosed herein wherein the electronic communication module has at least a portion of its outer surface surrounded by a rubber composition ("the surrounding rubber composition"), the dielectric constant of the rubber composition may vary. In certain such embodiments, the surrounding rubber composition has a permittivity of less than 7 at 915 MHz (e.g., 7, 6.5, 6, 5.5, 5, 4.5, 4, 3.5, 3, or 2.5 at 915 MHz), including 2.5 to 7 and 2.5 to 5 at 915 MHz and a loss factor of 0.005 to 0.5 at 915 MHz (e.g., 0.005, 0.01, 0.05, 0.1, 0.2, 0.3, 0.4, or 0.5 at 915 MHz. The permittivity and loss factor of the surrounding rubber compositions, as discussed herein, are measured on the compositions after curing or vulcanization, unless stated to the contrary. Preferably, the measurement of the permittivity or loss factor of the surrounding rubber composition is made upon a sample of rubber composition prior to using it to surround at least a portion of the outer surface of the radio device. However, if a measurement is being made upon an electronic communication device that has already had at least a portion of the outer surface of its radio device surrounded by the rubber composition, the measurement can be made either upon a sample of the same rubber composition that has not been used with the radio device or upon a sample of the rubber composition after it is removed from the outer surface of the radio device. In accordance with certain of the first and second embodiments disclosed herein, the surrounding rubber composition (when cured), has a permittivity at 915 MHz of less than 7, including 2.5 to 7, preferably 2.5 to 5.

According to the first and second embodiments disclosed herein, any rubber composition used to surround the outer surface of the electronic communication module or the outer surface of the antenna of the electronic communication module ("the surrounding rubber composition) may vary in composition (ingredients). In certain embodiments of the first and second embodiments, the surrounding rubber composition comprises 100 phr of at least one diene-based elastomer, and at least about 35 phr of carbon black (e.g., 35, 40, 45, 50, 55, 60, 65, 70, 75, 80, 85, 90, 95, or 100 phr), wherein the carbon black has a nitrogen surface area of no more than 30 m$^2$/g and a DBP absorption of no more than 60 cm$^3$/100 g and the rubber composition (when cured) has a dielectric constant at 915 MHz of less than 7; further details concerning such a rubber composition can be found in U.S. patent application Ser. No. 15/538,876, the entire disclosure of which is herein incorporated by reference. In certain embodiments of the first and second embodiments, the surrounding rubber composition comprises 100 phr of at least one diene-based elastomer, at least about 25 phr (e.g., 25, 30, 35, 40, 45, 50, 55, 60, 65, 70, 75, 80, 85, 90, 95, or 100 phr) in total of at least one non-reinforcing filler, no more than about 5 phr (e.g., 5, 4, 3, 2, 1 or 0 phr) of carbon black, and silica filler in an amount of 0 to about 70 phr (e.g., 0, 5, 10, 15, 20, 25, 30, 35, 40, 45, 50, 55, 60, 65, or 70 phr), and the rubber composition (when cured) has a dielectric constant at 915 MHz of less than 7; further details concerning such a rubber composition can be found in U.S. patent application Ser. No. 15/538,833 wherein the at least one non-reinforcing filler is discussed as including graphite, clay, titanium dioxide, magnesium dioxide, aluminum oxide, starch, talc, aluminum carbonate ($Al_2(CO_3)_2$), calcium carbonate ($CaCO_3$), magnesium carbonate ($MgCO_3$), calcium oxide, mica, calcium oxide, boron nitride, silicon nitride, aluminum nitride, calcium silicate (or silicon carbide ($Ca_2SiO_4$, etc.)), or crystalline aluminosilicates, the entire disclosure of which application is herein incorporated by reference. In certain embodiments of the first and second embodiments, the rubber composition comprises 100 phr of at least one diene-based elastomer, and about 20 phr to about 130 phr (e.g., 20, 25, 30, 35, 40, 45, 50, 55, 60, 65, 70, 75, 80, 85, 90, 95, 100, 105, 110, 115, 120, 125, or 130 phr) of ground, cured rubber; further details concerning such a rubber composition can be found in U.S. patent application Ser. No. 15/538,787, the entire disclosure of which is herein incorporated by reference.

As discussed above, in certain embodiments of the first and second embodiments, the electronic communication module has at least a portion of its outer surface surrounded by a rubber composition. In certain embodiments of the first and second embodiments disclosed herein, the radio device of the electronic communication module has an antenna and a majority of the outer surface of the antenna is surrounded by the rubber composition; in yet other embodiments of the first, second, and third embodiments disclosed herein the outer surface of the antenna of the electronic communication devices is entirely surrounded by the rubber composition. In certain embodiments of the first and second embodiments disclosed herein, the portion of the outer surface of the radio device of the electronic communication module that is surrounded by the rubber composition comprises at least 10%, at least 20%, at least 30%, at least 40%, at least 50%, at least 60%, at least 70%, at least 80%, at least 90%, at least 95% or 100%; in such embodiments the foregoing may include the ranges 10-50%, 10-60%, 10-70%, 10-80%, 10-90%, 10-95%, 10-100%, 20-50%, 20-60%, 20-70%, 20-80%, 20-90%, 20-95%, 20-100%, 30-50%, 30-60%, 30-70%, 30-80%, 30-90%, 30-95%, 30-100%, 40-50%, 40-60%, 40-70%, 40-80%, 40-90%, 40-95%, 40-100%, 50-60%, 50-70%, 50-80%, 50-90%, 50-95%, 50-100%, 60-70%, 60-80%, 60-90%, 60-95%, 60-100%, 70-80%, 70-90%, 70-95%, 70-100%, 80-90%, 80-95%, 80-100%, 90-95%, 90-100%, and 95-100%. In certain embodiments of the first, second, and third embodiments disclosed herein, the radio device of the electronic communication module has a majority of its outer surface surrounded by the rubber composition. The phrase "a majority" as used herein refers to greater than 50% and should be understood to encompass up to 100%. Thus, in accordance with certain of the first and second embodiments, 51-100%, 51-99%, 51-95%, 51-90%, 51-80%, 51-70%, 51-60%, 60-100%, 60-99%, 60-90%, 60-80%, 60-70%, 70-100%, 70-99%, 70-95%, 70-90%, 70-80%, 80-100%, 80-99%, 80-95%, 80-90%, 90-100%, 90-99%, or 90-95% of the outer surface of the radio device is surrounded by the rubber composition of the electronic communication module. In certain embodiments of the first and second embodiments, the surrounding rubber composition of the electronic communication module is in direct contact with the outer surface of the radio device. In other embodiments of the first and second embodiments, one or more coatings, films, or other materials may form an intermediate layer disposed between the outer surface of the radio device and the surrounding rubber composition. Such intermediate layers may be used, for example, as a sizing or primer to improve adhesion of the outer surface of the radio device and the rubber composition.

According to the first and second embodiments, the thickness of the rubber composition that surrounds at least a portion of the outer surface of the radio device may vary. In certain embodiments of the first and second embodiments disclosed herein, the thickness of the rubber composition is relatively uniform around the outer surface of the radio device. In other embodiments of the first and second embodiments disclosed herein, the thickness of the rubber composition varies around the outer surface of the radio device. In certain embodiments of the first and second embodiments disclosed herein, the thickness of the rubber composition that surrounds at least a portion of the outer surface of the radio device is about 0.5 mm to about 3 mm (including 0.5 mm to 3 mm), including about 1 mm to about 3 mm (including 1 mm to 3 mm).

Radio Device

In accordance with the first and second embodiments disclosed herein, the electronic communication module includes a radio device. The radio device includes any suitable radio device known in the art capable of storing information (i.e., data), communicating information, or both storing and communicating information with another device. In certain embodiments of the first and second embodiments, the radio device disclosed herein is capable of conveying information. The conveying of information by the radio device may comprise the receipt of a radio signal combined with transponding (by reflecting) a portion of the received radio signal back to a reader with a signal modulated by varying the radio device's antenna impedance. Generally, such a radio device which conveys information by transponding in response to being activated by energy (e.g., electromagnetic waves) sent by an external, remote transponder (e.g., an interrogator-type or reader-type of transponder) is considered a passive device. In certain embodiments of the first and second embodiments, the radio device disclosed herein is capable of actively transmitting information; such a radio device is an active device because it can actively transmit information. Certain such active devices transmit without the need for any activation by an external, remote transponder (e.g., at periodic intervals) and other such active devices actively transmit information in response to an appropriate activation received from an external, remote transponder. In certain embodiments of the first and second embodiments, the radio device conveys or transmits information via electromagnetic radio waves having a frequency in the range that is allowable according to local regulations. For example, in the United States, this frequency generally ranges from about 900 MHz to about 930 MHz (including 900 MHz to 930 MHz) (the current approved range being 902-928 MHz at a power level not to exceed 36 dbm) and in portions of Europe and Asia may be at a somewhat lower frequency of about 860 MHz (including 860 Mz) (the current approved range in portions of Europe is 865.6-867.6 MHz at a power level not to exceed 33 dBm). Generally, the radio devices discussed herein will be designed to convey or transmit information at a frequency ranging from about 860 MHz to about 960 MHz (including 860 MHz to 960 MHz). However, in certain embodiments, the radio devices discussed herein may be designed to convey or transmit information at another frequency range. Examples of suitable radio devices for use with the electronic communication modules of the first and second embodiments disclosed herein include transponders (e.g., devices that both receive information and transpond at least a portion of it), transmitters, receivers, and reflectors. Generally, the radio device is configured to convey or transmit information to/from an external, remote communication device, which itself may be a transponder, transmitter, receiver, or reflector depending on the functionality of the radio device of the electronic communication module of the first and second embodiments that it is communicating with (e.g., if the remote communication device is a transmitter, the electronic communication module's radio device is a transponder, receiver, or reflector capable of interacting with the electromagnetic waves sent from the transmitter). As used herein, the term "radio device" is inclusive of any and all of the components necessary to operate as a transponder, transmitter, receiver, or reflector, e.g., a circuit board, memory, antenna, etc.

The types of radio devices useful in the first and second embodiments disclosed herein include radio identification or tracking devices which may contain unique identifier information associated with the tire such that may be used in one or more of manufacturing, distribution, sale, and use activities associated with the tire. A specific example of a use activity includes information added during the use of a tire, such as could be added during retreading. A specific example of such identification or tracking device is a radio frequency identification device, more commonly referred to as an "RFID" device. In accordance with certain embodiments of the first and second embodiments, the radio device is an RFID device. Other examples of the radio devices include radio monitoring devices capable of measuring and/or storing temperature, pressure or other physical parameters associated with an operating tire. Other examples of suitable radio devices include those with both identification and monitoring functionality.

In certain embodiments of the first and second embodiments: at least one of the following is met: (a) the electronic communication module is located in the sidewall of the tire; (b) the electronic communication module is located in the carcass of the tire; (c) the electronic communication module is located in the body skim of the tire; (d) the electronic communication module further comprises an antenna having a length of 10 to 150 mm; or (e) the electronic communication module has at least a portion of its outer surface surrounded by a rubber-containing coating. In certain such embodiments, at least one of (a)-(c) is met and both of (d) and (d) are met.

Antenna

Generally, according to the first and second embodiments disclosed herein, the electronic communication module further comprises (includes) an antenna. The length of the antenna may vary. In certain embodiments of the first and second embodiments, the electronic communication module includes an antenna having a length of 10 to 150 mm (e.g., 10, 20, 30, 40, 50, 60, 70, 80, 90, 100, 110, 120, 130, 140, or 150 mm). In certain embodiments of the first and second embodiments, the antenna has a length of 25 to 100 mm (e.g., 25, 35, 45, 55, 65, 75, 85, 95, or 100 mm) or a length of 25 to 75 mm (e.g., 25, 35, 45, 55, 65, or 75 mm).

Tires

As discussed above, the methods of the first and second embodiments disclosed herein relate to increasing and/or improving the read range of an electronic communication module within a tire. The tire comprises (includes) a tread, one or more belts, a carcass with body ply or plies, two beads, and an electronic communication module. In certain embodiments of the first and second embodiments, the tire may comprise (include) additional components.

According to the first and second embodiments, the type of tire to which the methods relate are not particularly limited. In certain embodiments of the first and second embodiments, the tire is a passenger or light truck tire. In certain embodiments of the first and second embodiments, the tire is a commercial tire (e.g., commercial truck or bus). In certain embodiments of the first and second embodiments, the tire is a heavy duty tire (e.g., intended for use at a mine or construction site). In certain embodiments of the first and second embodiments, the tire is a pneumatic tire. In other embodiments of the first and second embodiments, the tire is a non-pneumatic tire. According to the first and second embodiments, the size of the tire may vary and in certain embodiments one or more of the following parameters may be met: (a) tread width of the tire (from sidewall to sidewall) of 185 mm to 1800 mm (e.g., 185, 195, 205, 215, 225, 235, 245, 255, 265, 275, 285, 295, 305, 315, 325, 335, 345, 355, 365, 375, 385, 395, 405, 415, 425, 435, 445, 455, 500, 600, 700, 800, 900, 1000, 1100, 1200, 1300, 1400, 1500, 1600, 1700 or 1800 mm); (b) aspect ratio (based upon sidewall height) of 35 to 100% (e.g., 35, 40, 45, 50, 55, 60, 65, 70, 75, 80, 85, 90,95 or 100%); or (c) diameter (relating to diameter of the wheel the tire is designed for use upon) of 15 to 70 inches (e.g., 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70 inches), 15 to 30 inches, 15 to 25 inches, or 15 to 63 inches or the corresponding mm such as about 380 to 1800 mm (e.g., 380, 400, 500, 600, 700, 800, 900, 1000, 1100, 1200, 1300, 1400, 1500, 1600, 1700 or 1800 mm), about 380 to 800 mm, about 380 to 635 mm, or about 380 to 1600 mm.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, strain may be applied to the tire to increase the read range and/or to increase the same-distance signal strength using different methods consistent with the disclosure in the Detailed Description above.

A tire having measurements of 295/75R22.5 was manufactured. The tire was a radial tire having a width (measured from sidewall to sidewall) of 295 mm, an aspect ratio (relating to sidewall height) of 75%, and was designed for use on a wheel having a 22.5 inch diameter. The tire contained an electronic communication module embedded between the sidewall and bead filler. Strain was applied to the tire by mounting and unmounting the tire. The read range of the electronic communication module within the tire was measured twice: first before mounting and then after mounting and unmounting of the tire upon a heavy duty truck tire changer. For measuring the read range, an Impinj Speedway Revolution brand reader (manufactured by Impinj, Inc. of Seattle, Wash.) was used (measurements were made indoors at a room temperature of about 70 degrees Fahrenheit), and the electronic communication module included a linear antenna, had 27 dBm output power and operated at a frequency of 905-928 MHz. Prior to mounting of the tire, the read range of the electronic communication module was measured to be 1.3 meters and after mounting and unmounting was measured to be 1.9 meters. Thus, applying strain by mounting and unmounting the tire resulted in an increase in the read range of 45%.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application, in its broader aspects, is not limited to the specific details and embodiments described. Accordingly, departures may be made from such details without departing from the spirit or scope of the applicant's general inventive concept.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. A method for increasing the read range of an electronic communication module within a tire, the method comprising:
   providing a tire comprising a tread, one or more belts, a carcass with body ply or plies, two beads, and an electronic communication module comprising a radio device and
   applying strain to the tire without abrading the tread,
   wherein applying strain results in an increase in the read range of at least 20%.

2. The method of claim 1, wherein applying strain comprises mounting and unmounting the tire.

3. The method of claim 1, wherein applying strain comprises applying external force to the tire at a location surrounding the electronic communication module.

4. The method of claim 3, further comprising fixing at least one bead prior to applying external force.

5. The method of claim 1, wherein applying strain comprises laterally deflecting the tire.

6. The method of claim 3, further comprising mounting the tire before applying strain and then unmounting the strained tire.

7. The method of claim 5, further comprising mounting the tire before applying strain and then unmounting the strained tire.

8. The method of claim 5, further comprising fixing the two beads and clamping the tread at its outside prior to laterally deflecting.

9. The method of claim 1, wherein at least one of the following is met:
   a. the electronic communication module is located in the sidewall of the tire;
   b. the electronic communication module is located in the carcass of the tire;
   c. the electronic communication module is located in the body skim of the tire;
   d. the electronic communication module further comprises an antenna having a length of 10 to 150 mm; or
   e. the electronic communication module has at least a portion of its outer surface surrounded by a rubber-containing coating.

10. The method of claim 9, wherein at least one of (a)-(c) is met and (d) and (e) are also met.

11. A tire resulting from the method of claim 1.

12. The method of claim 9, wherein (a), (d) and (e) are met.

13. The method of claim 9, wherein (b), (d) and (e) are met.

14. The method of claim 9, wherein (c), (d) and (e) are met.

15. The method of claim 1, wherein the tire is a commercial truck or bus tire.

16. The method of claim 1, wherein the tire is a heavy duty tire.

17. The method of claim 1, wherein the tire is a non-pneumatic tire.

18. The method of claim 9, wherein the tire is a commercial truck or bus tire.

19. The method of claim 9, wherein the tire is a heavy duty tire.

20. The method of claim 9, wherein the tire is a non-pneumatic tire.

* * * * *